(12) United States Patent
Krogstad

(10) Patent No.: US 6,272,234 B1
(45) Date of Patent: Aug. 7, 2001

(54) CONTRAST ADJUSTMENT IN A LASER IMAGER

(75) Inventor: Robert T. Krogstad, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/218,124

(22) Filed: Dec. 21, 1998

Related U.S. Application Data

(60) Provisional application No. 60/109,787, filed on Nov. 25, 1998.

(51) Int. Cl.$^7$ ........................................................ G06K 9/00
(52) U.S. Cl. ............................................. 382/128; 250/455
(58) Field of Search .............................. 73/1.82; 250/307; 364/413.15; 382/51, 6, 128

(56) References Cited

U.S. PATENT DOCUMENTS

| | | | |
|---|---|---|---|
| 4,991,093 | * 2/1991 | Roberge et al. | 364/413.15 |
| 5,046,118 | * 9/1991 | Ajewole et al. | 382/51 |
| 5,172,419 | * 12/1992 | Manian | 382/6 |
| 5,332,898 | * 7/1994 | Toro-Lira et al. | 250/307 |
| 5,827,942 | * 10/1998 | Madsen et al. | 73/1.82 |

* cited by examiner

*Primary Examiner*—Joseph Mancuso
*Assistant Examiner*—Abolfazl Tabatabai
(74) *Attorney, Agent, or Firm*—William F. Noval

(57) ABSTRACT

A method of processing a digital image comprising the steps of: providing a digital medical image; and processing the digital medical image for contrast as follows: for contrast <0 use a linear function to calculate the entire contrast look-up-table; for contrast 0, the contrast look-up-table is an identity table, and for contrast greater than 0, a linear function is used to calculate the linear region and for regions near $D_{min}$ and $D_{max}$, the nonlinear function $y=x^n$ is used.

2 Claims, 2 Drawing Sheets

CONTRAST ADJUSTMENT IN A LASER IMAGER

This application claims benefit to Provisional Application No. 60/109,787 filed Nov. 25, 1998.

FIELD OF THE INVENTION

This invention relates in general to image processing and relates in particular to contrast adjustment in a laser imager.

BACKGROUND OF THE INVENTION

Laser printers have become widely used in medical imaging to produce hard copy (film) images of electronic medical images derived from a variety of sources (e.g., medical film digitizers, computed and direct radiography, diagnostic imaging modalities—CT, MRI, PET, US). Typically, electronic medical images are processed before printing for various image characteristics, such as contrast, window, level, reverse image, density. A change in contrast changes the code value to density mapping. In existing wet process laser printers, contrast was included in an output look-up-table, taking advantage of the inherent nonlinearity of the printer's code value to density relationship to provide roll-off at low and high densities for contrast greater than 0.

With the advent of dry laser printers, it is desirable to provide greater control over contrast which is greater than zero.

SUMMARY OF THE INVENTION

According to the present invention, there is provided a solution to the problems of the prior art.

According to a feature of the present invention, there is provided a method of processing a digital image comprising the steps of: providing a digital medical image; and processing the digital medical image for contrast as follows: for contrast <0 use a linear function to calculate the entire contrast look-up-table; for contrast 0, the contrast look-up-table is an identity table, and for contrast greater than 0, a linear function is used to calculate the linear region and for regions near $D_{min}$ and $D_{max}$, the nonlinear function $y=x^n$ is used.

ADVANTAGEOUS EFFECT OF THE INVENTION

The invention provides for control of contrast in medical laser printers.

DETAILED DESCRIPTION OF THE INVENTION

Figure 1:
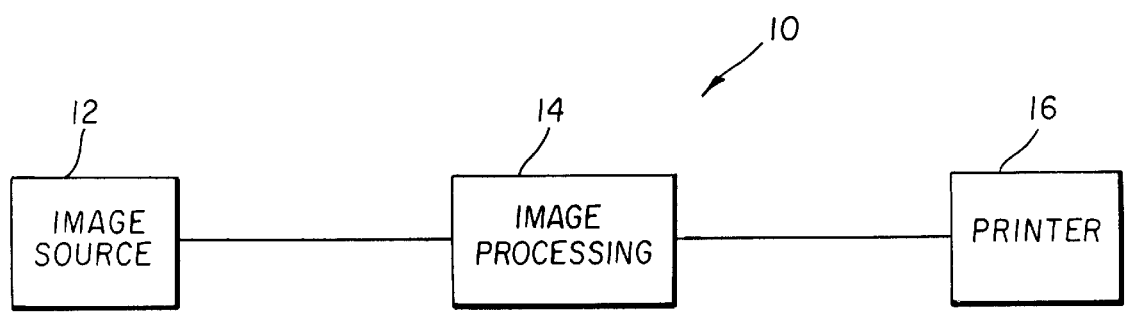
FIG. 1 is a block diagram of a laser imager.

Referring now to FIG. 1, there is shown a laser imager incorporating the present invention. As shown, laser imager 10 includes a source 12 of electronic (digital) medical images, a digital image processor 14 and a laser printer 16. Processor 14 can be a digital computer which carries out image processing, such as contrast, on a digital medical image from source 12 before it is provided to laser printer 16 which produces a hard copy (film, paper) image.

Contrast is specified by three parameters, range, pivot, and slope. Range is the number of elements in the table. The table starts at 0. For a 12-bit printer, the range is 4096 (0 through 4095). Pivot is the code value which is unchanged. It must be within the code value range. If the pivot is specified as a density, $$\text{pivot\_codevalue} = cv\max * \frac{\text{pivot\_density} - D_{\min}}{D_{\max} - D_{\min}}.$$

Slope is the ratio between no change and the desired slope. It is usually specified as a contrast parameters used to index into a table. (There is no formula.) Contrast 0 is the most common case.

| Contrast Setting | Slope (compared to contrast 0) |
|---|---|
| −5 | 0.600 |
| −4 | 0.670 |
| −3 | 0.745 |
| −2 | 0.825 |
| −1 | 0.910 |
| 0 | 1.000 |
| 1 | 1.090 |
| 2 | 1.185 |
| 3 | 1.285 |
| 4 | 1.390 |
| 5 | 1.500 |

For contrast >0, separate formulas are required for the linear and nonlinear parts.

Linear Formula Every contrast LUT has a linear region. For contrast $\leq 0$ (slope $\leq 1$), the entire contrast LUT is linear.

$$\text{contrast}[cv]=cv+(\text{slope}-1)*(cv-\text{pivot})cv))$$

Nonlinear Formula

The nonlinear formula is the equation $y=x^n$, used from slope 0, at x=0, to the value of x for which the equation has the same slope as the linear region. Include a scaling factor so the equation has the same slope as the linear region when they intersect. The slope for the linear region must be less than the exponent. For n=2, $y=\text{scale}*x^2$.

Constrast <0

For contrast <0, use the linear formula to calculate the entire table.

Contrast 0

For contrast 0, the contrast LUT is an identity table (contrast[n]=n)

Contrast >0

For contrast >0, use the linear formula to calculate the linear region and the nonlinear formula in the regions near $D_{min}$ and $D_{max}$.

Contrast Calculation

The contrast >0 calculation is presented form general to specific. In each case, the input code value is x and the output code value, or contrast LUT entry is y, so contrast [cv]=f(cv) becomes y=f(x). First is the general case of any exponent for the formula $y=x^n$. Second is the specific case of the exponent set to 2 ($y=x^2$). Third is the case of specific slope and pivot values. In each case, the slope must be less than the exponent. For n=2, enhanced contrast must always have a slope less than twice the original slope.

General Solution

Near the pivot point use the linear formula:

$$y=x+((\text{slope}-1)*(x-\text{pivot}))$$

$$y=(\text{slope}*x)-\text{pivot}*(\text{slope}-1)$$

From the origin until the slope is the same at the linear formula slope, use the nonlinear formula:

$$y = \text{scale} * x^n$$

$$\text{scale} = \frac{\text{slope}^n}{n^n} * \frac{(n-1)^{n-1}}{(\text{slope}-1)^{n-1}} \bigg/ \text{pivot}^{n-1}$$

$$y = \frac{\text{slope}^n}{n^n} * \frac{(n-1)^{n-1}}{(\text{slope}-1)^{n-1}} * \frac{x^n}{\text{pivot}^{n-1}}$$

The linear and nonlinear functions have the same slope at:

$$x = \text{pivot} * \frac{n}{n-1} * \frac{\text{slope}-1}{\text{slope}}$$

Solution for n=2
The linear formula is independent of the exponent:

$$y=(\text{slope} * x)-\text{pivot} * (\text{slope}-1)$$

Setting the exponent to 2, the nonlinear formula is:

$$y = \frac{\text{slope}^n}{n^n} * \frac{(n-1)^{n-1}}{(\text{slope}-1)^{n-1}} * \frac{x^n}{\text{pivot}^{n-1}}$$

$$= \frac{\text{slope}^2}{2^2} * \frac{1}{\text{slope}-1} * \frac{x^2}{\text{pivot}}$$

$$y = 1/4 * \frac{\text{slope}^2}{(\text{slope}-1)} * \frac{x^2}{\text{pivot}}$$

The linear and nonlinear functions have the same slope at:

$$x = \text{pivot} * \frac{n}{n-1} * \frac{\text{slope}-1}{\text{slope}}$$

$$= 2 * \text{pivot} * \frac{\text{slope}-1}{\text{slope}}$$

Solution for slope=1.5, pivot=1000
The linear formula is:

$$y=(\text{slope} * x)-\text{pivot} * (\text{slope}-1)=(1.5 * x)-1000* (1.5-1)$$

$$y=(1.5 * x)-500$$

The nonlinear formula is:

$$y = 1/4 * \frac{\text{slope}^2}{(\text{slope}-1)} * \frac{x^2}{\text{pivot}}$$

$$= 1/4 * \frac{9/4}{0.5} * \frac{x^2}{1000}$$

$$= \frac{9}{32000} * x^2$$

The linear and nonlinear functions have the same slope at:

$$x = 2 * \text{pivot} * \frac{\text{slope}-1}{\text{slope}}$$

$$= 2 * 10001.5 - \frac{1}{1.5}$$

$$= 1000/1.5$$

$$= 666\ 2/3$$

Use the nonlinear formula for input code values 0 through 666 and the linear formula for code values 667–1000. Use the same logic to calculate contrast for code values from the pivot point to the maximum code value.

Figure 2:
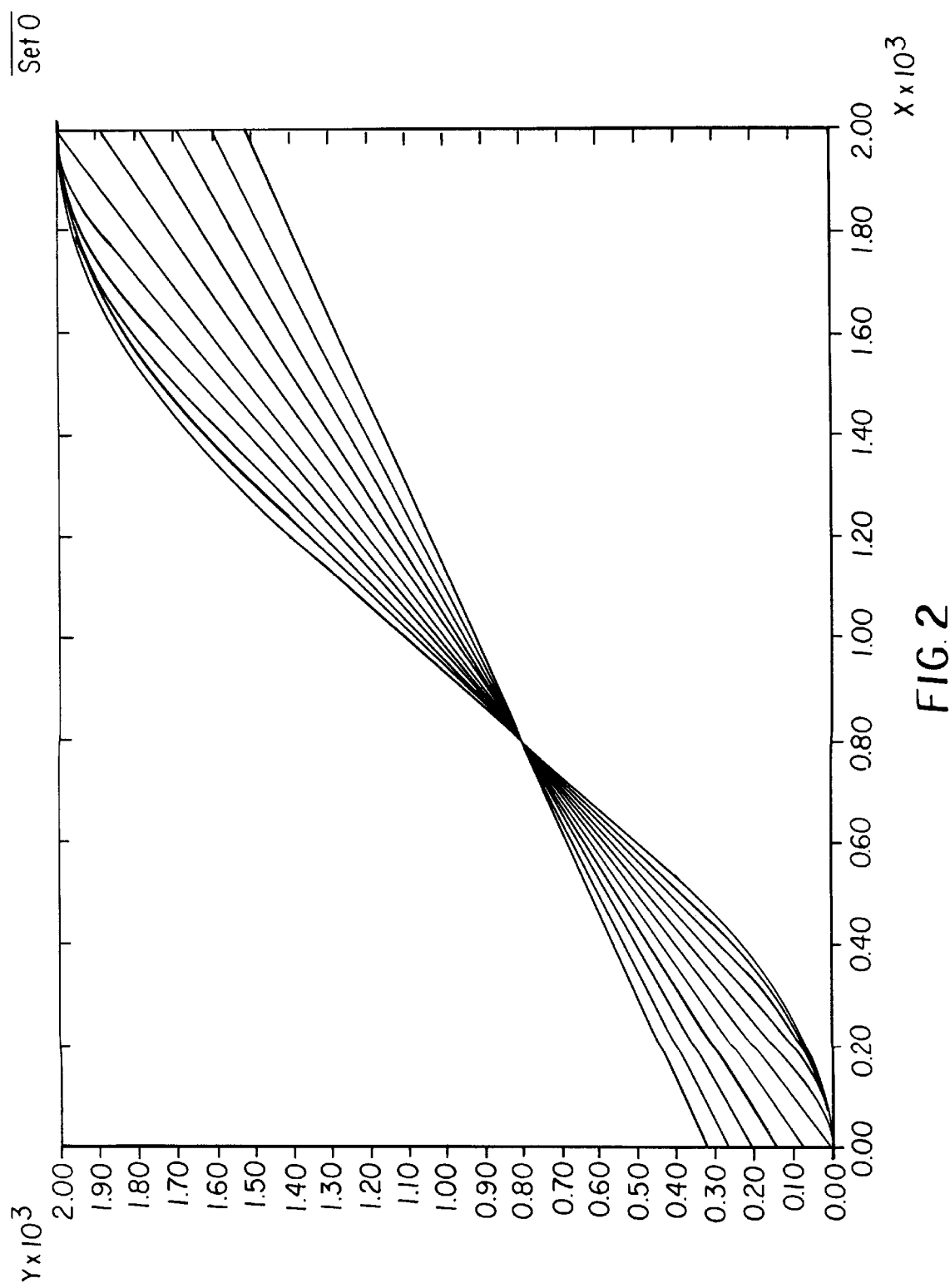
FIG. 2 is a diagram of contrast −5 through +5 with the pivot point set at 40% of full range.

FIG. 2 is a diagram of contrast −5 through +5. Pivot point is set at 40% of full range.

The invention has been described in detail with particular reference to certain preferred embodiments thereof, but it will be understood that variations and modifications can be effected within the spirit and scope of the invention.

PARTS LIST

10 laser imager
12 image source
14 digital image processor
16 laser printer

What is claimed is:

1. A method of processing a digital image comprising the steps of:
    providing a digital medical image; and
    processing siad digital medical image for contrast as follows:
        for contrast <0 use a linear function to calculate the entire contrast look-up-table;
        for contrast 0, the contrast look-up-table is an identity table, and
        for contrast greater than 0, linear function is used to calculate the linear region and for regions near $D_{min}$ and $D_{max}$, the nonlinear function $y=x^n$ is used wherein for contrast <0, said linear function is contrast $(cv)=cv+[(\text{slope}-1) * (cv-\text{pivot})cv]$
        where "cv" is the code value having a value of 0 to $2^n-1$;
        "slope" is the ratio between no change and the desired slope;
        "pivot" is a fixed cv having value between 0 and $2^n-1$, and $n$ is the depth of the digital image pixel in bits.

2. A method of processing a digital image comprising the steps of:
    providing a digital medical image; and
    processing said digital medical image for contrast as follows:
        for contrast <0 use a linear function to calculate the entire contrast look-up-table;
        for contrast 0, the contrast look-up-table is an identity table, and
        for contrast greater than 0, a linear function is used to calculate the linear region and for regions near $D_{min}$ and $D_{max}$, the nonlinear function $y=x^n$ is used wherein for contrast greater than 0, said nonlinear function is $$y = \frac{\text{slope}^n}{n^n} * \frac{(n-1)^{(n-1)}}{(\text{slope}-1)}(n-1) * \frac{x^n}{\text{pivot}}(n-1)$$

where "slope" is the ratio between no change and the desired slope;
"pivot" is a fixed code value having a value between 0 and $2^n31\ 1$; and
"n" the depth of the digital image pixel in bits.

* * * * *